United States Patent
Matsuura

[11] Patent Number: 5,816,600
[45] Date of Patent: Oct. 6, 1998

[54] BICYCLE CAPABLE OF WHEELING WITH MINIMIZED PEDALLING FORCE

[76] Inventor: Hiromu Matsuura, 15-7, Higashikagaya 3-chome, Suminoe-ku Osaka-shi, 559, Japan

[21] Appl. No.: 706,561

[22] Filed: Sep. 5, 1996

[30] Foreign Application Priority Data

Sep. 5, 1995 [JP] Japan ................................ 7-010769 U
Mar. 14, 1996 [JP] Japan .................................... 8-087194

[51] Int. Cl.⁶ ...................................................... F16H 1/28
[52] U.S. Cl. .......................................... 280/260; 280/259
[58] Field of Search .................................... 280/259, 260, 280/261

[56] References Cited

U.S. PATENT DOCUMENTS

| | | | |
|---|---|---|---|
| 1,845,192 | 2/1932 | Roberds | 280/260 |
| 4,193,324 | 3/1980 | Marc | 280/260 |
| 4,856,376 | 8/1989 | Billini | 280/260 |
| 5,419,572 | 5/1995 | Stiller et al. | 280/260 |

FOREIGN PATENT DOCUMENTS

| | | |
|---|---|---|
| 952573 | 11/1949 | France . |
| 2259006 | 8/1975 | France . |
| 100682 | 10/1897 | Germany ................ 280/260 |
| 18314 | of 1893 | United Kingdom .......... 280/260 |
| 118 | of 1897 | United Kingdom .......... 280/260 |
| 2055077 | 2/1981 | United Kingdom . |

*Primary Examiner*—Daniel G. DePumpo
*Attorney, Agent, or Firm*—Birch, Stewart, Kolasch & Birch, LLP

[57] ABSTRACT

A bicycle of a type capable of wheeling with a minimized pedalling force. The bicycle includes an internally threaded ring gear provided at a free end of a crank arm for applying a driving force to a wheel, an externally threaded gear rotatable in engagement with the internally threaded ring gear. The internally threaded ring gear and the externally threaded gear have a gear ratio chosen to be 2:1. A pedal having a tread is fixed to the externally threaded gear with the tread assuming an upwardly oriented, horizontal position when the free end of the crank arm is oriented forward from a crankshaft providing an axis of rotation of the crank arm and, at the same time, a portion of gear teeth of the internally threaded ring gear furthest from the crankshaft is engaged with the externally threaded gear.

6 Claims, 8 Drawing Sheets

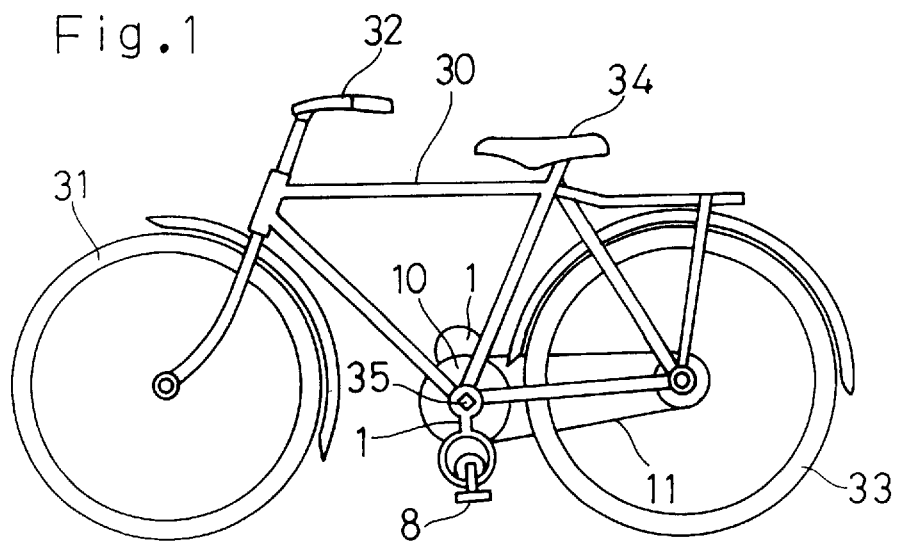

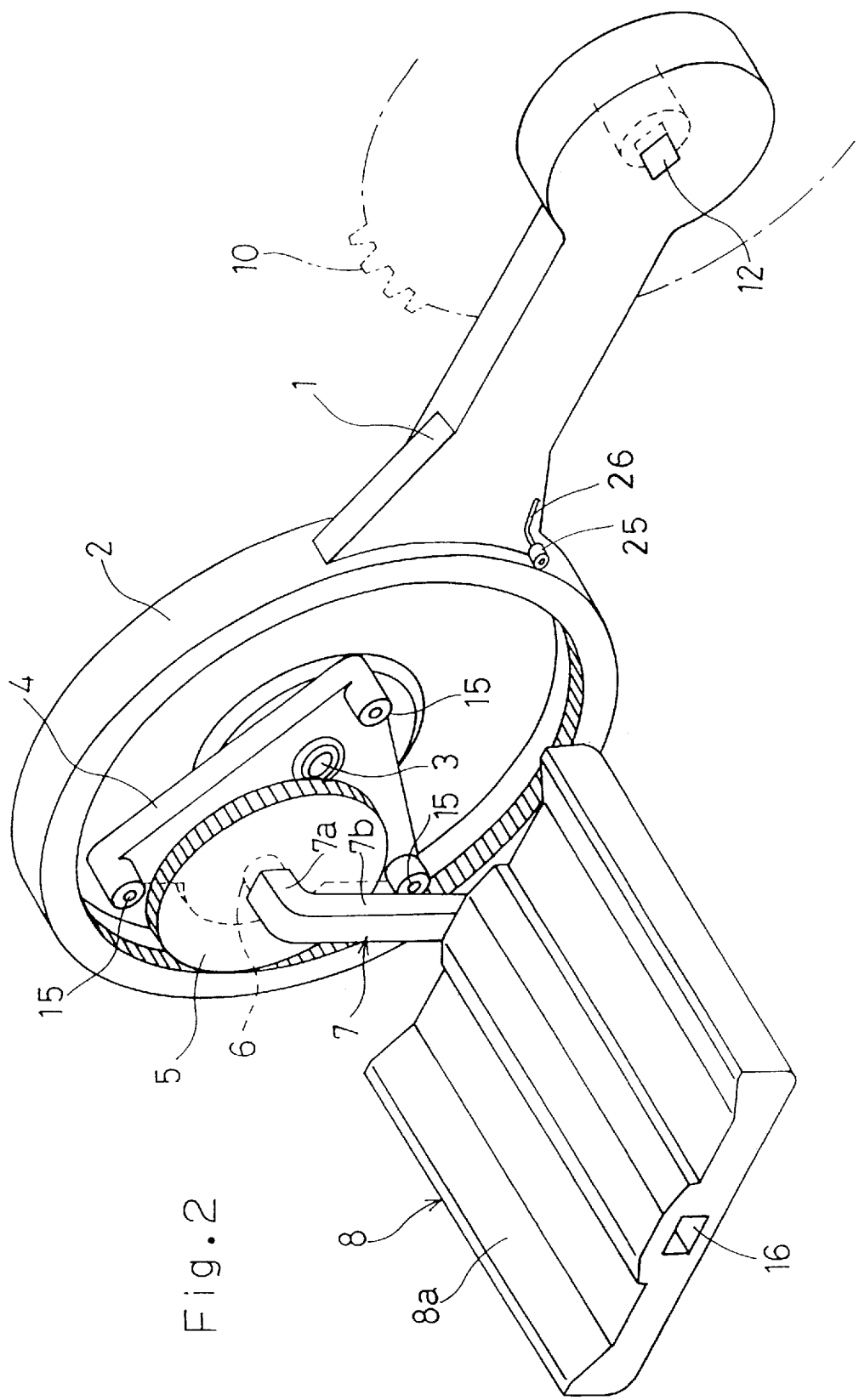

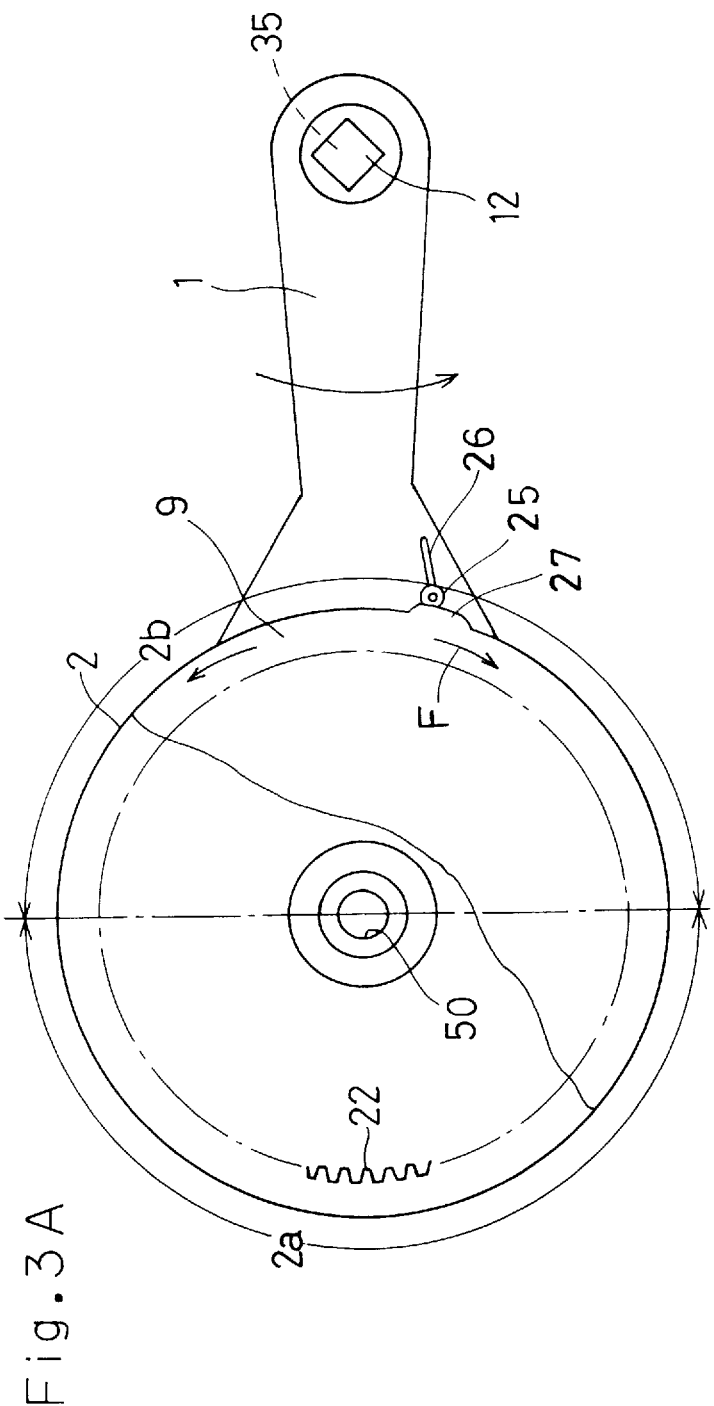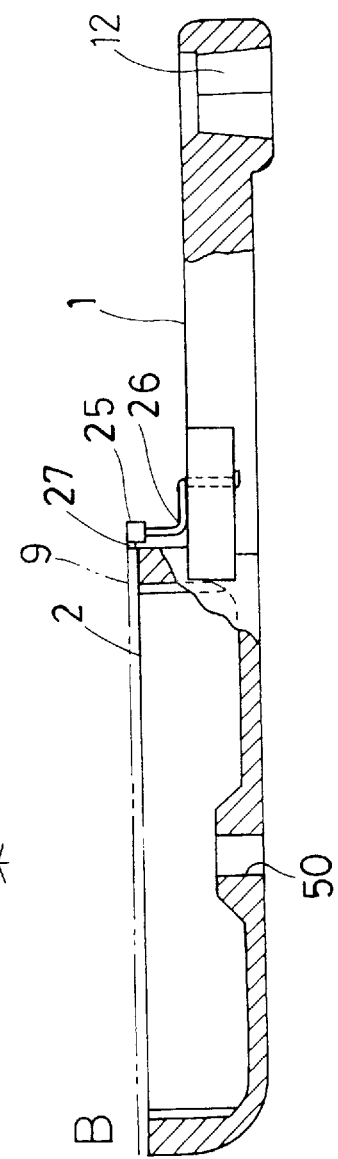

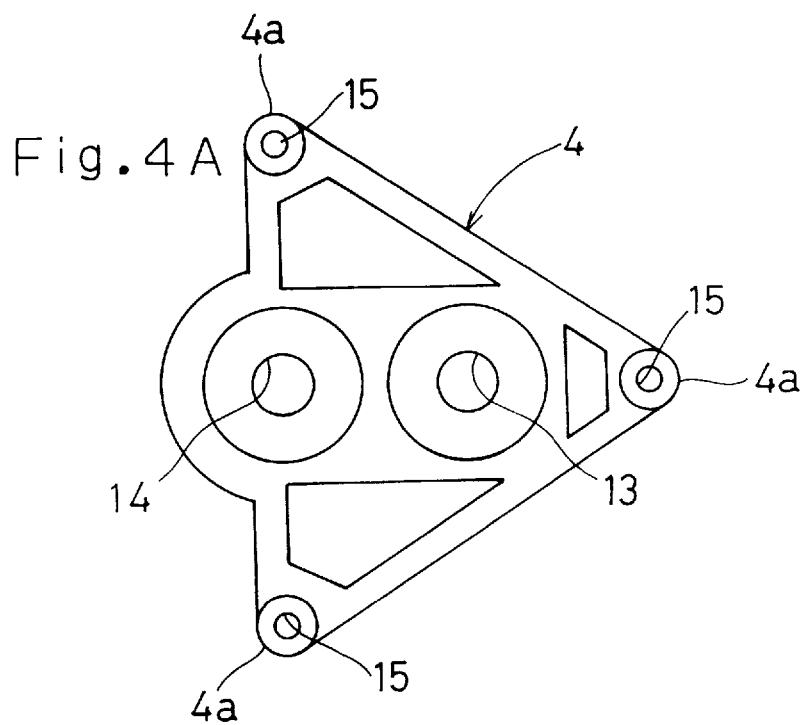
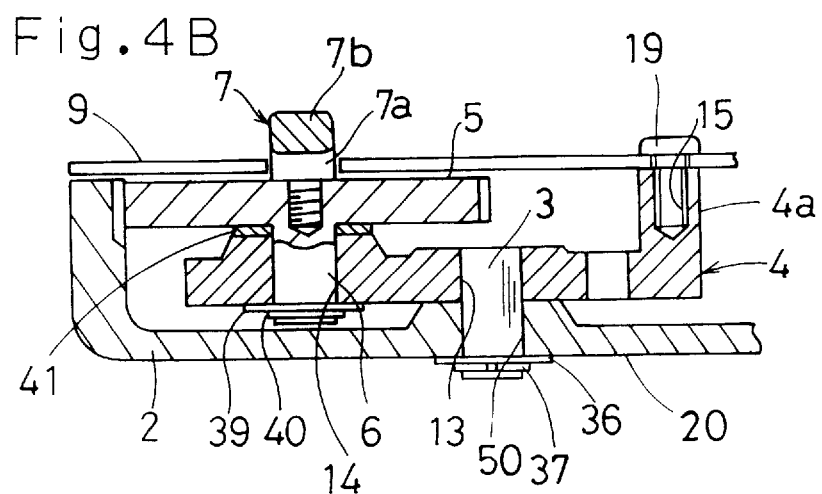

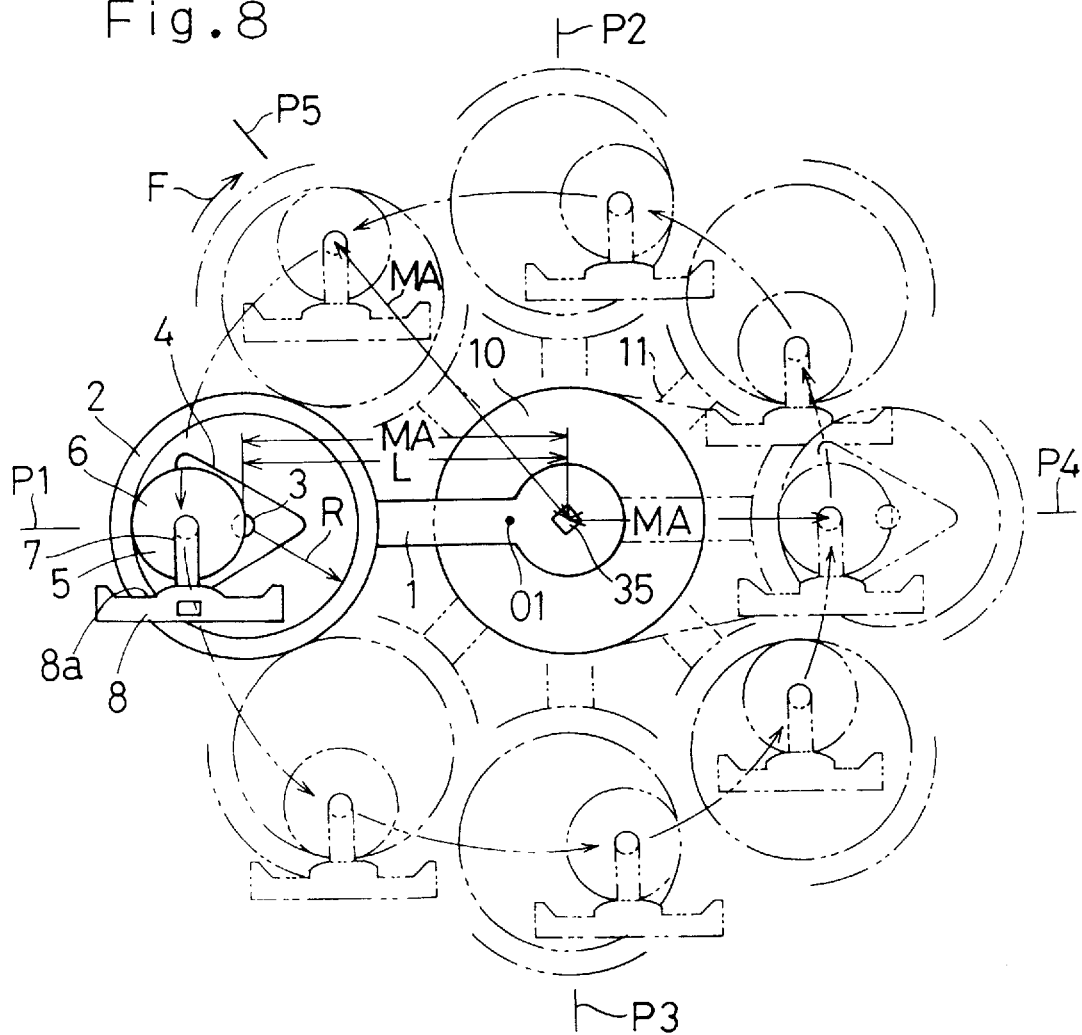

BICYCLE CAPABLE OF WHEELING WITH MINIMIZED PEDALLING FORCE

BACKGROUND OF THE INVENTION 1. (Field of the Invention)

The present invention generally relates to a bicycle and, more particularly, the bicycle of a type capable of wheeling with a minimized pedalling force.

2. (Description of the Prior Art)

In general, bicycles currently available in the market have foot-operated pedals rotatably mounted on support shafts fixed to free ends of crank arms, respectively. By pedalling the pedals, the crank arms are driven to transmit a driving force to a rear wheel through a generally endless drive chain.

In this most standard design, the driving force transmitted to the rear wheel depends on the pedalling force applied to the pedals and the distance (moment arm) between a crankshaft, through which respective base ends of the crank arms are coupled to a chain wheel, and the support shafts for the pedals. Accordingly, if a large driving force is desired with a minimized pedalling force, the moment arm between the crankshaft and the support shaft for each of the pedals has to be increased. However, the moment arm referred to above generally has an optimum value so chosen as to secure a smooth turning motion of the cyclist's feet then pedalling and, therefore, bicycle manufacturers have long recognized a limitation with which the moment arm cannot be increased over the optimum value. For this reason, it has long been recognized that no high driving force can be obtained with a minimized pedalling force.

SUMMARY OF THE INVENTION

Accordingly, the present invention has been devised with a view to substantially eliminating the above discussed problem hitherto encountered by bicycle manufacturers and has for its essential object to provide an improved bicycle in which a high driving force can be obtained with a minimized pedalling force.

To this end, the present invention provides a bicycle of a type capable of wheeling with a minimized pedalling force. The bicycle includes an internally threaded ring gear provided at a free end of a crank arm for applying a driving force to a wheel, an externally threaded gear rotatable in engagement with the internally threaded ring gear. The internally threaded ring gear and the externally threaded gear have a gear ratio chosen to be 2:1. A pedal having a tread is fixed to the externally threaded gear with the tread assuming an upwardly oriented, horizontal position when the free end of the crank arm is oriented forward from a crank shaft providing an axis of rotation of the crank arm and, at the same time, a portion of gear teeth of the internally threaded ring gear furthest from the crankshaft is engaged with the externally threaded gear.

With this bicycle according to the present invention, when at the time of pedalling the crank arm has its free end oriented forward and lies horizontally, that portion of gear teeth of the internally threaded ring gear furthest from the crankshaft is engaged with the externally threaded gear and, therefore, the moment arm of the pedalling force applied to the pedal attains a high value equal to the sum of the distance between the axis of rotation of the crank arm and the center of the internally threaded ring gear and the distance between the center of the internally threaded ring gear and the center of the externally threaded gear. Moreover, since at this time the tread of the pedal is oriented upwardly and horizontally, access of a cyclist's foot to the pedal is accomplished easily. Accordingly, with a minimized pedalling force, a relatively high driving force can be obtained.

Also, since the gear ratio between the internally threaded ring gear and the externally threaded gear is chosen to be 2:1, one complete rotation of the crank arm effected while the tread of the pedal on which the cyclists foot rests is oriented upwardly, results in one complete revolution of the externally threaded gear within the internally threaded ring gear. Accordingly, when the crank arm being rotated forwards from an upwardly oriented, forward position enters a pedalling region in which the crank arm is angularly moved forwards, the externally threaded gear comes to engage that portion of the gear teeth of the internally threaded ring gear furthest from the crankshaft in the forward direction, allowing the crank arm to attain the increased moment arm within the pedalling region.

In one preferred embodiment of the present invention, the bicycle further includes a pedal arm having a base end fixed to an axis of rotation of the externally threaded gear and extending in a direction radially of the externally threaded gear, in which case the pedal is secured to a free end of the pedal arm opposite to the base end. The pedal arm may be of a generally S-shaped configuration having the base and free ends both extending horizontally and a generally intermediate portion connecting the base and free ends thereof together and extending perpendicular to any one of the base and free ends.

According to this structure, even though the cyclist leaves his foot from the pedal while the crank arm is held at any angular position, the pedal is brought to a position immediately below the position of the center of the externally threaded gear by the effect of its own weight, allowing the externally threaded gear to revolve to an engagement position where the pedal assumes the horizontal position with its tread oriented upwardly. Accordingly, when the bicycle once stopped is to be wheeled, the cyclist can assuredly place his foot on the pedal 8 in readiness for pedalling.

In another preferred embodiment of the present invention, a link is rotatably disposed inside the internally threaded ring gear at a center location thereof and the externally threaded gear is rotatably mounted on the link. With this structure, the externally threaded gear can undergo a smooth revolution relative to the internally threaded ring gear.

In a further preferred embodiment of the present invention, the internally threaded ring gear has a plate secured to one end of the internally threaded ring gear. A covering is secured to the link for enclosing an opening of the internally threaded ring gear at the other end opposite to the plate. The use of the covering is effective to enclose the internally threaded ring gear enough to avoid any possible ingress of foreign matter into inside of the internally threaded ring gear, permitting engagement between the internally threaded ring gear and the externally threaded gear to be achieved smoothly.

In a yet further preferred embodiment of the present invention, a forced engagement means is employed for forcibly engaging the externally threaded gear with the internally threaded ring gear in a direction conforming to a direction of transmission of a pedalling force prior to the pedal being pedalled. The forced engagement means makes it possible to allow the externally threaded gear to be displaced a distance corresponding to the backlash at the time of start of the pedalling, to thereby minimize generation of obnoxious chattering sounds which would otherwise occur when one gear tooth of one of the internally threaded ring gear and the externally threaded gear collides with a mating gear tooth of the other of the internally threaded ring gear and the externally threaded gear.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1 is a schematic side view of a bicycle embodying the present invention;

FIG. 2 is a perspective view, on an enlarged scale, showing a cranking mechanism employed in the bicycle with a crank cover removed;

FIG. 3A is a plan view of the cranking mechanism showing a combination of a crank arm and an internally threaded ring gear assembly;

FIG. 3B is a side sectional view of the cranking mechanism with a portion cut away;

FIG. 4A is a plan view of a link forming a part of the cranking mechanism;

FIG. 4B is a sectional view of the link shown in FIG. 4A;

FIG. 8 is an explanatory diagram showing the operation of the cranking mechanism according to the present invention.

DETAILED DESCRIPTION OF THE EMBODIMENT

Figure 5A:
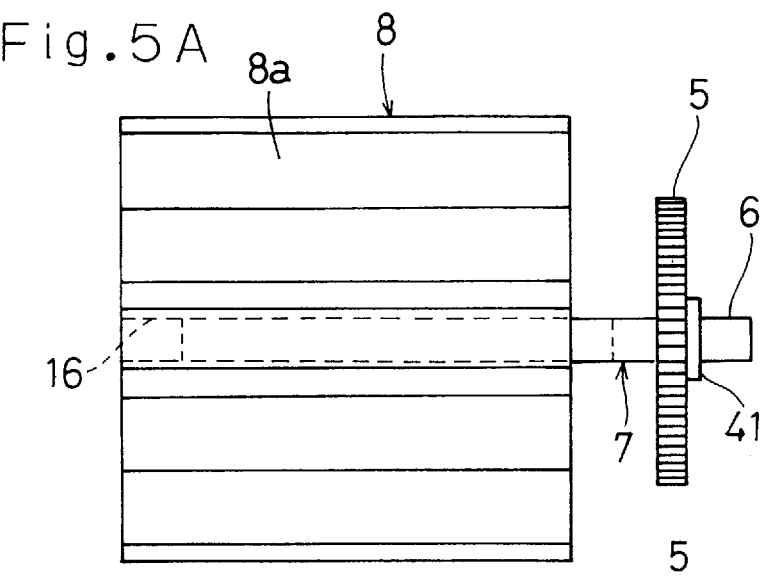
FIG. 5A is a plan view of showing a pedal combined with an externally threaded gear of the cranking mechanism.

Referring first to FIG. 1, a bicycle shown therein comprises a well-known, generally rhomboidal frame structure 30, a front wheel 31 rotatably supported at a front portion of the frame structure 30, a handlebar 32 also supported at the front portion of the frame structure 30 and coupled with the front wheel 31 to permit the front wheel 31 to be steered, a rear wheel 33 rotatably supported at a rear portion of the frame structure 30, and a saddle 34 mounted on a generally intermediate top portion of the frame structure 30. A crankshaft 35 is rotatably supported at a generally intermediate bottom portion of the frame structure 30 below the saddle 34 and extends in a plane perpendicular to the plane of rotation of the rear wheel 33 with its opposite ends situated on respective sides of the frame structure 30. Crank arms 1 are fixedly connected at their base ends to the respective ends of the crankshaft 35. The crank arms 1 are used to rotate the rear wheel 33 by means of a sprocket wheel 10, mounted on the crankshaft 35 for rotation together therewith, and a generally endless drive chain 11.

The bicycle of the structure so far described is well-known to those skilled in the art and, therefore, the further details thereof will not be described for the sake of brevity.

Referring now to FIG. 2, each of the crank arms 1 has a base end fixedly connected with the crankshaft 35 and also has a free end fixedly provided, or otherwise formed integrally, with an internally threaded gear assembly. FIGS. 3A and 3B illustrate a front elevational view and a side sectional view, with a portion cut away, respectively, of component parts of the internally threaded gear assembly integrally formed with the free end of each crank arm 1. The base end of the crank arm 1 is formed with a polygonal hole 12 for receiving the corresponding end of the crankshaft 35. The internally threaded ring gear assembly is in the form of a pan comprising an internally threaded ring gear 2 and a round plate 20 secured to, or otherwise formed integrally with, the internally threaded ring gear 2 so as to close one end of the internally threaded ring gear 2. The internally threaded ring gear assembly has bearing hole 50 defined in the round plate 20 in concentric relation with the round plate 20.

The internally threaded ring gear assembly accommodates a link 4 rotatably mounted on a stud shaft 3 which is in turn received in the bearing hole 50. FIG. 4A illustrates a front elevational view of the link 4 whereas FIG. 4B illustrates a sectional view thereof in the form as fitted to the internally threaded ring gear assembly. The link 4 is in the form of a generally triangular plate having a generally center portion formed with a first bearing hole 13 into which the stud shaft 3 is press-fitted. This triangular link 4 is also formed with a second bearing hole 14 defined at a location somewhat offset from the first bearing hole 13 for receiving a rotary shaft 6 of an externally threaded gear 5 as will be described later. A free end of the stud shaft 3 press-fitted into the first bearing hole 13 has a washer 36 and a generally C-shaped clip ring 37 mounted thereon with the washer 36 interposed between the round plate 20 and the C-shaped clip ring 37. The C-shaped clip ring 37 serves to avoid any possible accidental separation of the washer 36 from the stud shaft 3. Thus, it will readily be seen that the stud shaft 3 rotatably extending through the first bearing hole 13 in the triangular link 4 is rotatably, but axially non-movably supported in position by the round plate 20. For the purpose as will become clear from the subsequent description, the triangular link 4 is also formed with mount projections 4a formed at apex portions thereof so as to protrude in the same direction perpendicular to the plane of the triangular link 4, each of said mount projections 4a having an internally threaded hole 15 defined therein. The internally threaded holes 15 are used for receiving corresponding set screws used to secure a crank cover 9 so as to close an opening of the internally threaded ring gear 2 opposite to the round plate 20 as will be described later.

The rotary shaft 6 of the externally threaded gear 5 which rotates in engagement with the internally threaded ring gear 2 is supported in the second bearing hole 14 in the triangular link 4 in a rotatable, but non-axially movable fashion by means of a washer 39 and a generally C-shaped clip ring 40. An additional washer 41 is interposed between the triangular link 4 and the externally threaded gear 5. Accordingly, the externally threaded gear 5 is so supported by the triangular link 4 and so positioned relative to the internally threaded ring gear 2 as to revolve around the stud shaft 3 while rotating about the rotary shaft 6, with gear teeth of the internally threaded ring gear 2 meshed constantly with those of gear teeth of the externally threaded gear 5. In the illustrated embodiment, the gear ratio between the internally threaded ring gear 2 and the externally threaded gear 5 is chosen to be 2:1 such that one complete revolution of the externally threaded gear 5 within the internally threaded ring gear 2 results in one complete rotation of the externally threaded gear 5 about the rotary shaft 6.

Figure 5B:
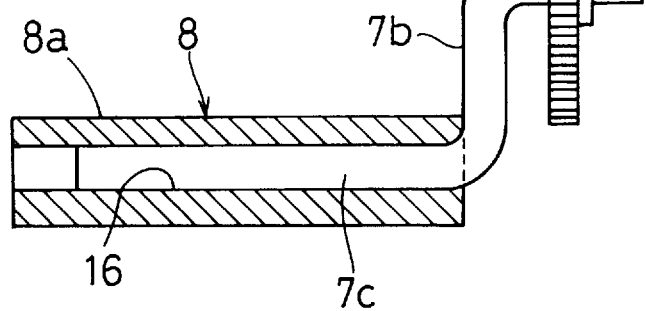
FIG. 5B is a side sectional view of the pedal and the externally threaded gear both shown in FIG. 5A, with a portion cut away.
Figure 5C:
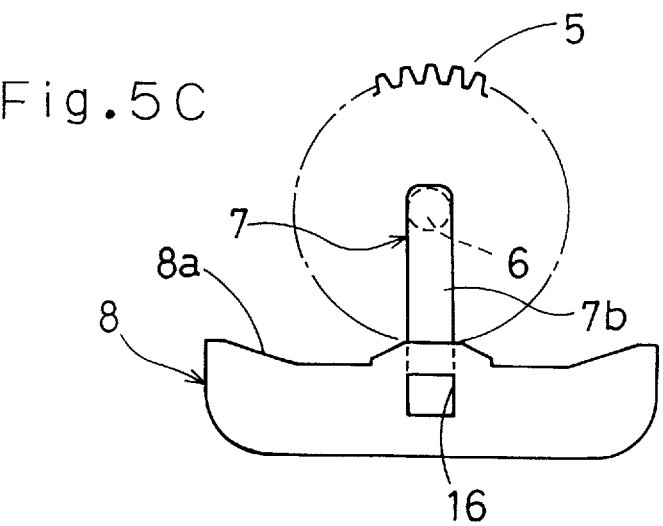
FIG. 5C is a schematic front elevational view of the pedal and the externally threaded gear.

As shown in FIGS. 2 and 5, a pedal 8 employed for each side of the bicycle and having a tread 8a is fitted to a center position of an outer surface of the externally threaded gear 5 through a pedal arm 7 which is of one-piece construction including a horizontally extending base end 7a, a generally intermediate portion 7b bent from the base end 7a so as to extend downwardly therefrom and a horizontally extending free end 7c bent from the intermediate portion 7b so as to extend in a direction counter to and substantially parallel to the horizontally extending base end 7a. More specifically, the pedal arm 7 has the base end 7a welded or screwed to, or otherwise formed integrally with, a center portion of the externally threaded gear 5 with the intermediate portion 7b extending radially outwardly of the externally threaded gear 5, and the free end 7c fixedly inserted into a mount hole 16 defined in the pedal 8 at a location substantially intermediate of the width of the pedal 8. The pedal 8 is fixed to the free end 7c of the pedal arm 7 so that when as shown in FIG. 8, the associated crank arm 1 has its free end held in position extending horizontally in a direction forward of the bicycle and the externally threaded gear 5 is therefore engaged with that portion of gear teeth 22 of the internally threaded ring gear 2 which is furthest from the crankshaft 35 in the forward direction of the bicycle, the pedal 8 can have its tread 8a oriented horizontally and upwardly.

Figure 6A:
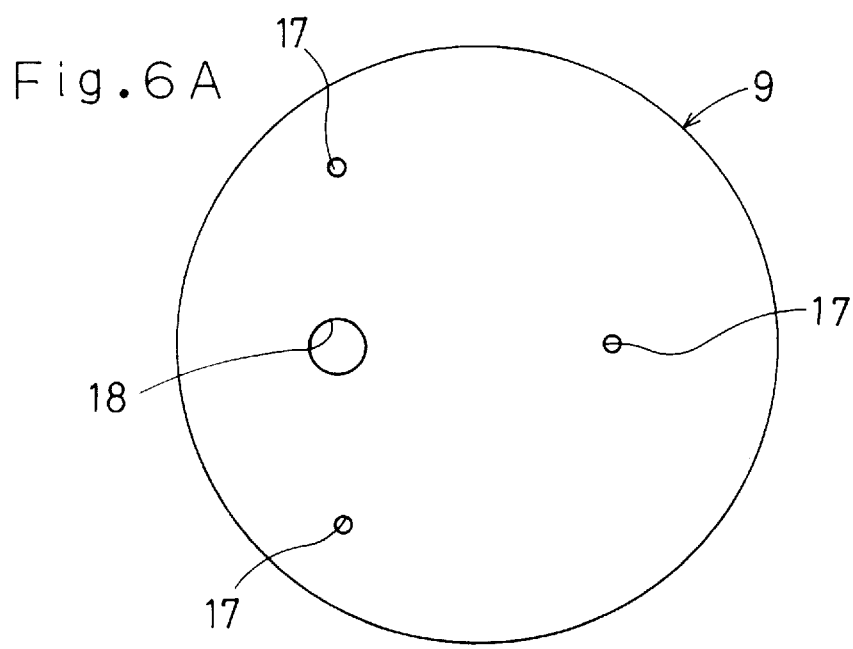
FIG. 6A is a plan view of a crank cover.
Figure 6B:
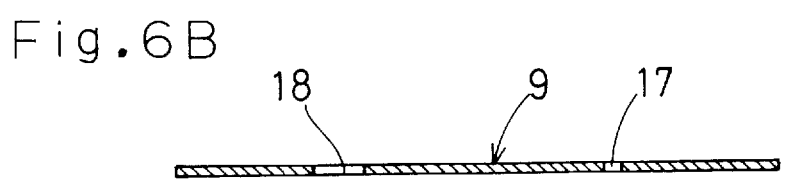
FIG. 6B is a sectional view of the crank cover shown in FIG. 6A.

An opening of the internally threaded ring gear 2 opposite to the round plate 20 is closed by the crank cover 9. A front elevational view and a sectional view of the crank cover 9 are shown in FIGS. 6A and 6B, respectively. As shown therein, the crank cover 9 is in the form of a round plate of a diameter equal to or substantially equal to the outer diameter of the internally threaded ring gear 2 and is formed with three screw holes 17 defined therein at respective location aligned with the internally threaded holes 15 in the associated mount projections 4a integral with the triangular link 4. Those screw holes 17 or the mount projections 4a are so positioned that when the crank cover 9 is fitted to the internally threaded ring gear assembly with the set screws 19 tapped into the associated internally threaded holes 15 after the set screws 19 have been passed through the corresponding screw holes 17, the crank cover 9 can assume a concentric relation with the internally threaded ring gear 2. The crank cover 9 is also formed with an arm hole 18 so defined therein and so positioned as to allow the base end 7a of the pedal arm 7 to extend loosely therethrough.

Figure 7:
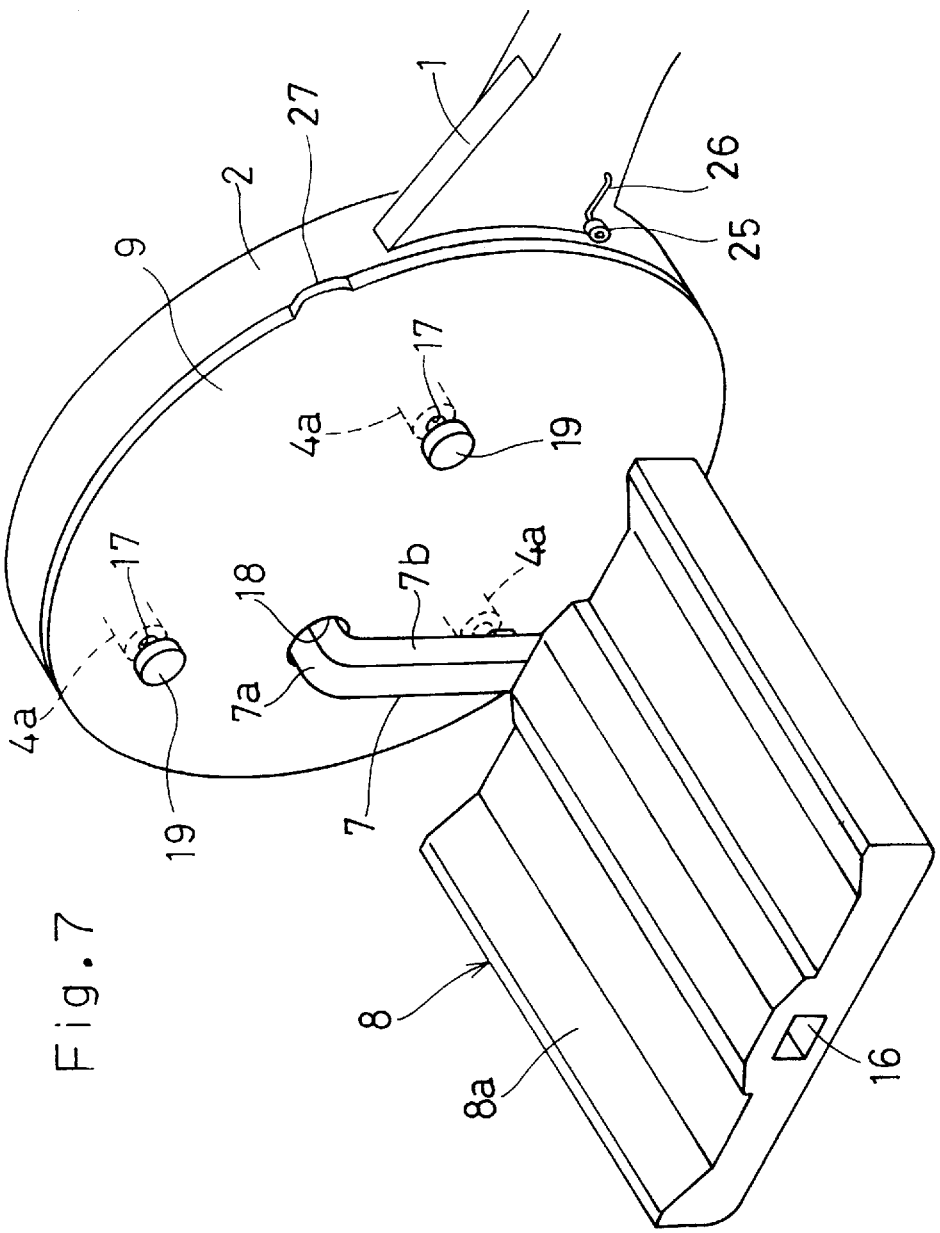
FIG. 7 is a perspective view showing the cranking mechanism with the crank cover fitted thereto.

In the illustrated embodiment, the crank cover 9 can be secured to the triangular link 4 by passing the base end 7a of the pedal arm 7 through the arm hole 18 and then fastening the set screws 19 into the internally threaded holes 15 in the triangular link 4 as shown in FIG. 7. However, any of various securing means may be employed for securing the crank cover 8 to the triangular link 4. For example, instead of the use of the internally threaded holes 15 in the triangular link 4, the use may be made of two or more engagement holes for receiving corresponding engagement projections formed in the crank cover 9.

Since the triangular link 4 rotates about the stud shaft 3 for the support of the internally threaded ring gear 2, the crank cover 9 correspondingly rotates about the stud shaft 3 together with the triangular link 4. Accordingly, the opening of the internally threaded ring gear 2 is securely closed by the crank cover 9 without being affected by the revolution of the externally threaded gear 5 around the stud shaft 3, to avoid any possible ingress of foreign matter into inside of the internally threaded ring gear 2 to thereby ensure a smooth angular movement of any one of the internally threaded ring gear 2, the triangular link 4 and the externally threaded gear 5.

While in the foregoing description reference has been made only to one of the crank arms 1 including its related cranking mechanism, the other of the crank arms 1 on the opposite side of the bicycle also includes a cranking mechanism of a construction identical with that described hereinbefore. It is, however, to be noted that the crank arms 1 situated on the respective sides of the bicycle are coupled to the respective opposite ends of the crankshaft 35, but angularly spaced 180° from each other with respect to the crankshaft 35.

In each of the cranking mechanisms hereinbefore described, since the gear ratio between the internally threaded ring gear 2 and the externally threaded gear 5 is chosen to be 2:1, one complete revolution of the externally threaded gear 5 inside the internally threaded ring gear 2 around the stud shaft 3 results in one complete rotation of the externally threaded gear 5 about the rotary shaft 6 and, therefore, the pedal 8 coupled with the externally threaded gear 5 can returns to and assume an initial position each time the externally threaded gear 5 undergoes one complete revolution about the stud shaft 3. On the other hand, when a cyclist's foot is placed on the tread 8a of the pedal 8, the tread 8a of the pedal 8 can be regulated to assume an upwardly oriented, horizontal position.

For this reason, when as shown in a left-hand half of the drawing of FIG. 8, the crank arm 1 is angularly moved within a pedalling region situated on a forward side and ranging from an upward position P2 in which the crank arm 1 extends generally vertically upwardly, to a downward position P3 in which the crank arm 1 extends generally vertically downwardly, the externally threaded gear 5 is meshed with a region 2a (See FIG. 3A) of the gear teeth 22 of the internally threaded ring gear 2 which is furthest from the crankshaft 35. Considering the gear ratio between the internally threaded ring gear 2 and the externally threaded gear 5, the externally threaded gear 5 has an outer diameter which is half the internal diameter of the internally threaded ring gear 2. Accordingly, the moment arm MA achieved when the crank arm 1 assumes a forward horizontal position P1 in which the crank arm 1 is oriented substantially horizontally and forwardly of the bicycle with the internally threaded ring gear 2 then meshed with that portion of the gear teeth 22 of the internally threaded ring gear 2 which is furthest from the crankshaft 35 in the forward direction of the bicycle, that is, the effective crank arm length is equal to the distance between the axis of rotation of the crankshaft 35 and the center of the externally threaded gear 5, that is, the position of the externally threaded gear 5 to which the pedal arm 7 is secured. In other words, the moment arm MA is expressed by the equation; $(L+R/2)$, wherein L represents the distance between the axis of rotation of the crankshaft 35 and the center of the internally threaded ring gear 2 and R represents the radius of the internally threaded ring gear 2.

On the other hand, when as shown in a right-hand half of the drawing of FIG. 8, the crank arm 1 is angularly moved within a non-pedalling region situated on a rearward side and ranging from the downward position P3 to the upward position P2, the externally threaded gear 5 is meshed with a region 2b (See FIG. 3A) of the gear teeth 22 of the internally threaded ring gear 2 which is closest to the crankshaft 35. Accordingly, the moment arm MA achieved when the crank arm 1 assumes a rearward horizontal position P4 in which the crank arm 1 is oriented substantially horizontally and rearwardly with respect to the direction of run of the bicycle is equal to the distance between the axis of rotation of the crankshaft 35 and the center of the externally threaded gear 5, that is, (L−R/2).

This accounts that during the pedalling the center of the externally threaded gear 5 angularly moves depicting the circle of a diameter that is equal to twice the distance L between the axis of rotation of the crankshaft 35 and the center of the internally threaded ring gear 2, that is, 2L=(L+R/2)+(L−R/2). The pedal 8 as well moves angularly along a similarly circular path. Considering that in the prior art bicycle each of the pedals is mounted on the crank arm at such a location that may be considered corresponding to the center of the internally threaded ring gear 2 employed in the practice of the present invention, the path of angular movement of the pedal in the prior art bicycle is represented by the circle of a radius which essentially corresponds to the distance L referred to in connection with the present invention with its center being on the crankshaft 35. The path of angular movement of the pedal 8 employed in the practice of the present invention is thus identical with that exhibited by the pedal employed in the prior art bicycle.

However, in the present invention, since the moment arm achieved during the pedalling within the pedalling region P2-P3 referred to above is at most greater by half the radius R of the internally threaded ring gear 2 than the radius of the circle representing the path of angular movement of the pedal which is equal to the distance L, for a given pedalling force a higher driving force than that afforded in the prior art bicycle can be obtained.

It is to be noted that when the crank arm 1 is angularly moved within the non-pedaling region (a region shown in a right-hand half of the drawing of FIG. 8), the moment arm MA is reduced to a value shorter at most by half the radius R of the externally threaded gear 5 than the radius (essentially equal to the distance L) of the circle represented by the angular movement of the pedal in the prior art bicycle, but pose no problem since no actual pedalling takes place during the angular movement of the crank arm 1 within the non-pedalling region.

According to the present invention, the position 01 of the center of the circle occupied by the path of movement of the externally threaded gear 5 coupled with the pedal 8 is shifted a distance equal to R/2 (i.e., the radius of the internally threaded ring gear 2) from the axis of rotation of the crankshaft 35 in the forward direction (or leftward as viewed in FIG. 8) and, therefore, in order for the position of the pedal 8 relative to the saddle 34 in the bicycle embodying the present invention to remain the same as in the prior art bicycle, the position of the crankshaft 35 may preferably be displaced a similar distance equal to R/2 in the rearward direction counter to the forward direction. Also, since the crank arm 1 of the structure shown in FIG. 2 has a length increased by a value equal to the radius R of the internally threaded ring gear 2 as compared with that in the prior art bicycle, the position of the crankshaft 35 above a ground surface should be shifted upwardly a distance equal to the increment of the length of the crank arm 1 so as to avoid any possible contact of the pedal 8 and the internally threaded ring gear 2 with the ground surface.

Moreover, since the pedal 8 is fixed to the externally threaded gear 5 through the pedal arm 7, the pedal 8 will rotate at a position lowered a predetermined level downwardly from the position of the center of the externally threaded gear 5. Accordingly, the height of the saddle 34 above the ground surface should preferably be adjusted in consideration of the distance over which the level of the pedal 8 is lowered and the amount of shift in height of the crankshaft 35.

Also, according to the present invention, even though when the bicycle is brought to a halt the cyclist leaves his foot from the pedal 8 while the pedal 8 does not assume a horizontal position, since the pedal 8 is fixed in position through the pedal arm 7 at a location offset from the externally threaded gear 5, the pedal 8 is brought to a position immediately below the position of the center of the externally threaded gear 5 by the effect of its own weight, allowing the externally threaded gear 5 to revolve to an engagement position where the pedal 8 assumes the horizontal position with its tread 8a oriented upwardly. Accordingly, when the bicycle once stopped is to be wheeled, the cyclist can assuredly place his foot on the pedal 8 in readiness for pedalling.

As best shown in FIGS. 2, 3A and 3B, each cranking mechanism according to the present invention includes a friction applying means. This friction applying means comprises a roller 25 made of synthetic resin and supported in the vicinity of the internally threaded ring gear 2 integral with the crank arm 1 by means of a metallic spring member 26. On the other hand, a contact piece 27 engageable with the resinous roller 25 is disposed at a predetermined position on the crank cover 9. The resinous roller 25, the spring member 26 and the contact piece 27 altogether constitute a forced engagement means operable to compensate for any possible displacement resulting from a backlash between the gear teeth 22 of the internally threaded ring gear 2 and the mating gear teeth of the externally threaded gear 5 to thereby ensure a forced engagement between the respective gear teeth of the internally and externally threaded gears 2 and 5. The spring member 26 is supported with one end thereof inserted into a bearing hole 28 defined in the crank arm 1 while the resinous roller 25 is rotatably mounted on the other end of the spring member 26 and is held in position to contact the contact piece 27 fast with the crank cover 9.

Referring again to FIG. 8, the crank arm 1 on one side of the bicycle rotates to a position P5, spaced a slight distance from the upward position P2 in the forward direction under the effect of an inertia force as a result of pedalling of the other crank arm 1 on the opposite side of the bicycle, and an actual pedalling starts from this position P5. The contact piece 27 is so secured to a predetermined position on the crank cover 9 that during the pedalling of the crank arm 1 from a position shortly before the pedaling start position P5 to a position immediately after the pedalling start position P5, the contact piece 27 can contact the resinous roller 25 to receive a frictional force F, acting in a direction counter to the direction of rotation of the crank cover 9, by means of a biasing force of the spring member 26.

When a pedalling force is applied to the pedal 8 while the crank arm 1 rotates to the pedalling start position P5, it may occur that rear faces of the gear teeth of the externally threaded gear 5 collide against front faces of the gear teeth 22 of the internally threaded ring gear 2 to thereby generate obnoxious rattling sounds. However, in the illustrated embodiment, the crank cover 9 rotatable together with the externally threaded gear 5 about the stud shaft 3 is imparted the frictional force F acting in the direction counter to the direction of rotation of the crank cover 9 to allow the rear faces of the gear teeth of the externally threaded gear 5 to contact the front faces of the gear teeth 22 of the internally threaded ring gear 2 beforehand. Accordingly, prior to the pedal arm 7 pedalled, the externally threaded gear 5 can be meshed with the internally threaded ring gear 2 in a direction conforming to the direction of transmission of the pedalling force and, therefore, at the time the pedal arm 7 is actually pedalled, the externally threaded gear 5 can be angularly displaced a distance corresponding to the backlash, which would otherwise occur between the externally threaded gear 5 and the internally threaded ring gear 2, to engage the internally threaded ring gear 2, thereby minimizing generation of the obnoxious chattering sounds.

As hereinbefore fully discussed, in the bicycle designed to require a minimized pedalling force according to the present invention, the engagement between the internally threaded ring gear 2 integral with the crank arm 1 and the externally threaded gear 5 fixed with the pedal is effective to provide a relatively high driving force with a minimized pedalling force.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications, unless they depart from the scope of the present invention as delivered from the claims annexed hereto, to be construed as included therein.

What is claimed is:

1. A bicycle of a type capable of wheeling with a minimized pedalling force, which comprises:

an internally threaded ring gear provided at a free end of a crank arm for applying a driving force to a wheel;

an externally threaded gear rotatable in engagement with the internally threaded ring gear;

said internally threaded ring gear and said externally threaded gear having a gear ratio of 2:1; and a pedal having a tread and fixed to the externally threaded gear with the tread assuming an upwardly oriented, horizontal position when the free end of the crank arm is oriented forward from a crank shaft providing an axis of rotation of the crank arm and, at the same time, a gear portion of the internally threaded ring gear furthest from the crankshaft is engaged with the externally threaded gear.

2. The bicycle as claimed in claim 1, further comprising a pedal arm having a base end fixed to an axis of rotation of the externally threaded gear and extending in a direction radially of the externally threaded gear, said pedal being secured to a free end of the pedal arm opposite to the base end.

3. The bicycle as claimed in claim 2, wherein said pedal arm is of a generally S-shaped configuration having the base and free ends both extending horizontally and a generally intermediate portion connecting the base and free ends thereof together and extending perpendicular to any one of the base and free ends.

4. The bicycle as claimed in claim 1, further comprising a link rotatably disposed inside the internally threaded ring gear at a center location thereof, said externally threaded gear being rotatably mounted on the link.

5. The bicycle as claimed in claim 4, wherein the internally threaded ring gear has a plate secured to one end of the internally threaded ring gear, and further comprising a covering for enclosing an opening of the internally threaded ring gear at the other end opposite to the plate.

6. The bicycle as claimed in claim 1, further comprising a forced engagement means for forcibly engaging the externally threaded gear with the internally threaded ring gear in a direction conforming to a direction of transmission of a pedalling force prior to the pedal being pedalled.

* * * * *